United States Patent
Ichiba

Patent Number: 6,154,015
Date of Patent: Nov. 28, 2000

[54] DC-DC CONVERTER

[75] Inventor: Kohji Ichiba, Kanagawa, Japan

[73] Assignee: Ricoh Company, Ltd., Tokyo, Japan

[21] Appl. No.: 09/354,919

[22] Filed: Jul. 13, 1999

[30] Foreign Application Priority Data

| Jul. 14, 1998 | [JP] | Japan | 10-198689 |
| Nov. 5, 1998 | [JP] | Japan | 10-314160 |

[51] Int. Cl.[7] .............. G05F 1/613; G05F 1/40
[52] U.S. Cl. .............................. 323/225; 323/283
[58] Field of Search ........................ 323/222, 225, 323/282, 283, 284, 351; 363/41, 56

[56] References Cited

U.S. PATENT DOCUMENTS

| 5,565,762 | 10/1996 | Ishikawa et al. | 323/222 |
| 5,627,459 | 5/1997 | Itoyama et al. | 323/283 |
| 5,793,623 | 8/1998 | Kawashima et al. | 363/56 |

FOREIGN PATENT DOCUMENTS 7322608 12/1995 Japan.

*Primary Examiner*—Jessica Han
*Attorney, Agent, or Firm*—Cooper & Dunham LLP

[57] ABSTRACT

A controller generates a load control signal for pulse-width modulation control for changing the duty factor of switching transistors so that the ON period of the switching transistors is elongated when said controller determines based on an error detection amplification signal that the load-side output direct current has increased, and the ON period of the switching transistors is shortened when said controller determines based on the error detection amplification signal that the load-side output direct current has decreased, in the condition in which the switching frequency is kept constant. A driver selecting portion selects, according to the load-light/heavy detection signal, at least one switching transistor to be activated, from among the plurality of switching transistors, and supplying the load control signal to the thus-selected at least one switching transistor.

18 Claims, 6 Drawing Sheets

DC-DC CONVERTER

BACKGROUND OF THE INVENTION

1. Field of the Invention

The present invention relates to a semiconductor device for power supply, and, in particular, to a DC-DC converter which is a kind of a switching-type constant-voltage power supply in which, when an externally supplied voltage given by an external supply power source such as a battery or the like is converted into a predetermined constant voltage, and, then, is outputted, determination is made as to whether a condition of a load to which the constant voltage is provided is a heavy load condition or a light load condition, and switching of a switching transistor is controlled in accordance with the load condition so that an improvement in power-supply efficiency is achieved at the time of a light load.

2. Description of the Prior Art

As such a kind of DC-DC converter in the prior art, there is one which is disclosed in Japanese Laid-Open Patent Application No. 7-322608 (see FIG. 1), for example.

Specifically, a DC-DC converter 2A in the prior art, shown in FIG. 1, supplies power, via a common power-supply line 18A, to a heavy-load circuit 12A such as a DC-motor driving circuit or the like and a light-load circuit 15A such as an IC circuit generating a control signal or the like. The DC-DC converter 2A has a switching circuit including a transistor 5A which is inserted in series or in parallel to the heavy-load circuit and light-load circuit and performing switching control of the transistor 5A for the power-supply line 18A, a control circuit 6A which controls periods of switching of the transistor 5A through pulse-width modulation (PWM) control or pulse-frequency modulation (PFM) control according to a voltage V001 at a load side so that this voltage V001 is fixed, and an oscillation circuit 7A which turns on and turns off the transistor 5A in a predetermined period.

In the DC-DC converter having the above-described circuit arrangement, a control unit 20A (MCU) causes a battery voltage Vcc of a battery 16A to be provided to the control circuit 6A via a switch 8A, causing the control circuit 6A to operate so that the control circuit 6A performs the pulse-width modulation control, when power is supplied to the heavy-load circuit 12A. The control unit 20A causes the battery voltage Vcc of the battery 16A not to be provided to the control circuit 6A, causing the control circuit 6A to stop operating, and, simultaneously, causing the battery voltage Vcc of the battery 16A to be provided to the oscillation circuit 7A via the switch 8A, causing the oscillation circuit 7A to operate so that the oscillation circuit 7A performs the pulse-frequency modulation control, when power is supplied only to the light load circuit 15A.

However, in this DC-DC converter 2A in the prior art, because switching is performed such that the pulse-width modulation control or the pulse-frequency modulation control is used according to the load condition, although the efficiency is improved when the switching is performed such that the pulse-frequency modulation control is used at the time of light load, the load-side output direct-current voltage problematically includes a noise having a random frequency.

SUMMARY OF THE INVENTION

The present invention has been devised for solving such a problem occurring in the prior art. First, an object of the present invention is to achieve improvement in the power-supply efficiency at the time of a light load in a condition in which the pulse-width modulation control is maintained, that is, in a condition in which the output direct-current voltage includes no noise having a random frequency.

Second, in consideration of a fact that the current amount needed for charging or discharging the gate capacitance of a switching transistor(s) which is(are) a driver transistor(s) generating the load-side output direct-current voltage is the largest among the current amounts needed when the internal clock signal is generated, control is performed such as to reduce the total gate size of the switching transistors (driver transistors) to be charged or discharged, at the time of a light load at which time the load current is small, thereby, achieving reduction of the consumed power in the switching transistors, and, as a result, improvement in the power-supply efficiency at the time of the light load.

Further, for a similar purpose, an object of the present invention is to achieve reduction in the number of operations of charging or discharging the gate capacitance of the switching transistor per unit time, and, thereby, to achieve improvement in the power supply efficiency at the time of a light load as a result of performing control such as to decrease the frequency in the pulse-width modulation control of the switching transistor (driver transistor) at the time of the light load at which time the load current is small.

A DC-DC converter according to the present invention is a kind of a switching-type constant-voltage power supply in which switching control is performed on switching transistors so that an external supply voltage from an external supply power source is converted into a predetermined constant voltage, wherein a duty factor which is the ratio of the ON period to the total of the ON period and the OFF period of the switching transistors is changed so that the ON period is elongated when a load-side output direct-current voltage has decreased and the ON period is shortened when the load-side output direct-current voltage has increased, in a condition in which the switching frequency is kept constant. The DC-DC converter comprises: load-current detecting means for detecting whether power consumed in a load to which the load-side output direct-current voltage is provided is small or large, and generating a load-light/heavy detection signal corresponding to whether the power is small or large; error detection amplification means for detecting the amount of deviation of the value of the load-side output direct-current voltage from a target voltage value, and generating an error detection amplification signal corresponding to the amount of deviation; controlling means for generating a load control signal for pulse-width modulation control for changing the duty factor of the switching transistors so that the ON period of the switching transistors is elongated when the controlling means determines based on the error detection amplification signal that the load-side output direct current has increased, and the ON period of the switching transistors is shortened when the controlling means determines based on the error detection amplification signal that the load-side output direct current has decreased, in the condition in which the switching frequency is kept constant; the plurality of switching transistors, each of which is connected in parallel to the load, for providing the load-side output direct-current voltage to the load according to the load control signal; and driver selecting means for selecting, according to the load-light/heavy detection signal, the switching transistor(s) to be activated, from among the plurality of switching transistors, and supplying the load control signal to the thus-selected switching transistor(s).

In this arrangement, the controlling means (controller) generates the load control signal for the pulse-width modulation control for changing the duty factor of the switching transistors so that the ON period of the switching transistors is elongated when the controlling means determines based on the error detection amplification signal that the load-side output direct current has increased, and the ON period of the switching transistors is shortened when the controlling means determines based on the error detection amplification signal that the load-side output direct current has decreased, in the condition in which the switching frequency is kept constant. Further, the driver selecting means selects, according to the load-light/heavy detection signal, the switching transistor(s) to be activated, from among the plurality of switching transistors, and supplies the load control signal to the thus-selected switching transistor(s).

Thus, for example, when the load-light/heavy detection signal indicates that the power consumed in the load to which the load-side output direct-current voltage is provided is large (at the time of a heavy load), both of two switching transistors are selected, and the load control signal is supplied to the thus-selected two switching transistors. However, when the load-light/heavy detection signal indicates that the power consumed in the load to which the load-side output direct-current voltage is provided is small (at the time of a light load), only one of the two switching transistors is selected, and the load control signal is supplied only to the thus-selected switching transistor. Thus, at the time of the light load, only one of the two switching transistors is activated, and, thus, the total gate size of the switching transistors is reduced at the time of the light load.

As a result, the current amount needed for charging and discharging the gate capacitances of the switching transistors which generate the load-side output direct-current voltage, among the current amounts needed when the internal clock signal is generated, can be reduced. As a result, the power consumed in the switching transistors can be reduced, and, thereby, high power-supply efficiency can be achieved, even at the time of a light load.

A DC-DC converter according to another aspect of the present invention is a kind of a switching-type constant-voltage power supply in which switching control is performed on a switching transistor so that an external supply voltage from an external supply power source is converted into a predetermined constant voltage, wherein a duty factor which is the ratio of the ON period to the total of the ON period and the OFF period of the switching transistor is changed so that the ON period is elongated when a load-side output direct-current voltage has decreased and the ON period is shortened when the load-side output direct-current voltage has increased, in a condition in which the switching frequency is kept constant. The DC-DC converter comprises: load-current detecting means for detecting whether power consumed in a load to which the load-side output direct-current voltage is provided is small or large, and generating a load-light/heavy detection signal corresponding to whether the power is small or large; PWM-control-frequency generating oscillation means for generating a clock signal for generating a PWM control signal specifying control parameters for performing pulse-width modulation control in which control a switching frequency (PWM control frequency) for turning on and turning off the switching transistor is low when the oscillation means determines, based on the load-light/heavy detection signal, that a load-side output direct current is small, and generating the clock signal for generating the PWM control signal specifying the control parameters for performing the pulse-width modulation control in which control the switching frequency (PWM control frequency) for turning on and turning off the switching transistor is high when the oscillation means determines, based on the load-light/heavy detection signal, that the load-side output direct current is large; error detection amplification means for detecting the amount of deviation of the value of the load-side output direct-current voltage from a target voltage value, and generating an error detection amplification signal corresponding to the amount of deviation; controlling means for generating, based on the clock signal, a load control signal for pulse-width modulation control for changing the duty factor of the switching transistor so that the ON period of the switching transistor is elongated when the controlling means determines based on the error detection amplification signal that the load-side output direct current has increased, and the ON period of the switching transistor is shortened when the controlling means determines based on the error detection amplification signal that the load-side output direct current has decreased, in the condition in which the switching frequency is kept constant; and the at least one switching transistor for providing the load-side output direct-current voltage to the load according to the load control signal.

In this arrangement, the PWM-control-frequency generating oscillation means (oscillator) generates the clock signal for generating the PWM control signal specifying the control parameters for performing pulse-width modulation control in which control the switching frequency (PWM control frequency) for turning on and turning off the switching transistor is low when the oscillation means determines, based on the load-light/heavy detection signal, that the load-side output direct current is small, and generates the clock signal for generating the PWM control signal specifying the control parameters for performing the pulse-width modulation control in which control the switching frequency (PWM control frequency) for turning on and turning off the switching transistor is high when the oscillation means determines, based on the load-light/heavy detection signal, that the load-side output direct current is large; the error detection amplification means detects the amount of deviation of the value of the load-side output direct-current voltage from the target voltage value, and generates the error detection amplification signal corresponding to the amount of deviation; and the controlling means (controller) generates, based on the clock signal, the load control signal for the pulse-width modulation control for changing the duty factor of the switching transistor so that the ON period of the switching transistor is elongated when the controlling means determines based on the error detection amplification signal that the load-side output direct current has increased, and the ON period of the switching transistor is shortened when the controlling means determines based on the error detection amplification signal that the load-side output direct current has decreased, in the condition, in which the switching frequency is kept constant; and the at least one switching transistor provides the load-side output direct-current voltage to the load according to the load control signal.

Thus, the control is performed such that, at the time of a light load when the load current is small, the switching frequency in the pulse-width modulation control of the switching transistor is decreased. As a result, the number of operations of charging and discharging the gate capacitance of the switching transistor which generates the load-side output direct-current voltage can be reduced. As a result, high power-supply efficiency can be achieved even at the time of the light load.

A DC-DC converter according to another aspect of the present invention is a kind of a switching-type constant-voltage power supply in which switching control is performed on switching transistors so that an external supply voltage from an external supply power source is converted into a predetermined constant voltage, wherein a duty factor which is the ratio of the ON period to the total of the ON period and the OFF period of the switching transistors is changed so that the ON period is elongated when a load-side output direct-current voltage has decreased and the ON period is shortened when the load-side output direct-current voltage has increased, in a condition in which the switching frequency is kept constant. The DC-DC converter comprises: load-current detecting means for detecting whether power consumed in a load to which the load-side output direct-current voltage is provided is small or large, and generating a load-light/heavy detection signal corresponding to whether the power is small or large; PWM-control-frequency generating oscillation means for generating a clock signal for generating a PWM control signal specifying control parameters for performing pulse-width modulation control in which control a switching frequency (PWM control frequency) for turning on and turning off the switching transistors is low when the oscillation means determines, based on the load-light/heavy detection signal, that a load-side output direct current is small, and generating the clock signal for generating the PWM control signal specifying the control parameters for performing the pulse-width modulation control in which control the switching frequency (PWM control frequency) for turning on and turning off the switching transistors is high when the oscillation means determines, based on the load-light/heavy detection signal, that the load-side output direct current is large; error detection amplification means for detecting the amount of deviation of the value of the load-side output direct-current voltage from a target voltage value, and generating an error detection amplification signal corresponding to the amount of deviation; controlling means for generating, based on the clock signal, a load control signal for pulse-width modulation control for changing the duty factor of the switching transistors so that the ON period of the switching transistors is elongated when the controlling means determines based on the error detection amplification signal that the load-side output direct current has increased, and the ON period of the switching transistors is shortened when the controlling means determines based on the error detection amplification signal that the load-side output direct current has decreased, in the condition in which the switching frequency is kept constant; the plurality of switching transistors, each of which is connected in parallel to the load, for providing the load-side output direct-current voltage to the load according to the load control signal; and driver selecting means for selecting, according to the load-light/heavy detection signal, the switching transistors), to be activated, from the plurality of switching transistors, and supplying the load control signal to the thus-selected switching transistor(s).

In this arrangement, the PWM-control-frequency generating oscillation means (oscillator) generates the clock signal for generating the PWM control signal specifying control parameters for performing the pulse-width modulation control in which control the switching frequency (PWM control frequency) for turning on and turning off the switching transistors is low when the oscillation means determines, based on the load-light/heavy detection signal, that the load-side output direct current is small, and generates the clock signal for generating the PWM control signal specifying the control parameters for performing the pulse-width modulation control in which control the switching frequency (PWM control frequency) for turning on and turning off the switching transistors is high when the oscillation means determines, based on the load-light/heavy detection signal, that the load-side output direct current is large; the error detection amplification means detects the amount of deviation of the value of the load-side output direct-current voltage from the target voltage value, and generates the error detection amplification signal corresponding to the amount of deviation; the controlling means (controller) generates, based on the clock signal, the load control signal for the pulse-width modulation control for changing the duty factor of the switching transistors so that the ON period of the switching transistors is elongated when the controlling means determines based on the error detection amplification signal that the load-side output direct current has increased, and the ON period of the switching transistors is shortened when the controlling means determines based on the error detection amplification signal that the load-side output direct current has decreased, in the condition in which the switching frequency is kept constant; and the driver selecting means selects, according to the load-light/heavy detection signal, the switching transistor(s) to be activated, from among the plurality of switching transistors, and supplies the load control signal to the thus-selected switching transistor(s).

Thus, the control is performed such that the total gate size of the switching transistors is reduced at the time of a light load at which time the load current is small, as described above. As a result, the current amount needed for charging and discharging the gate capacitances of the switching transistors which generate the load-side output direct-current voltage, among the current amounts needed when the internal clock signal is generated, can be reduced. As a result, the power consumed in the switching transistors can be reduced, and, thereby, high power-supply efficiency can be achieved, even at the time of the light load.

Further, the control is performed such that, at the time of the light load, the switching frequency in the pulse-width modulation control of the switching transistors is decreased. As a result, the number of times of charging and discharging the gate capacitances of the switching transistors which generate the load-side output direct-current voltage can be reduced. As a result, high power-supply efficiency can be achieved even at the time of the light load.

Other objects and further features of the present invention will become more apparent from the following detailed description when read in conjunction with the accompanying drawings.

DESCRIPTION OF PREFERRED EMBODIMENTS

Figure 1:
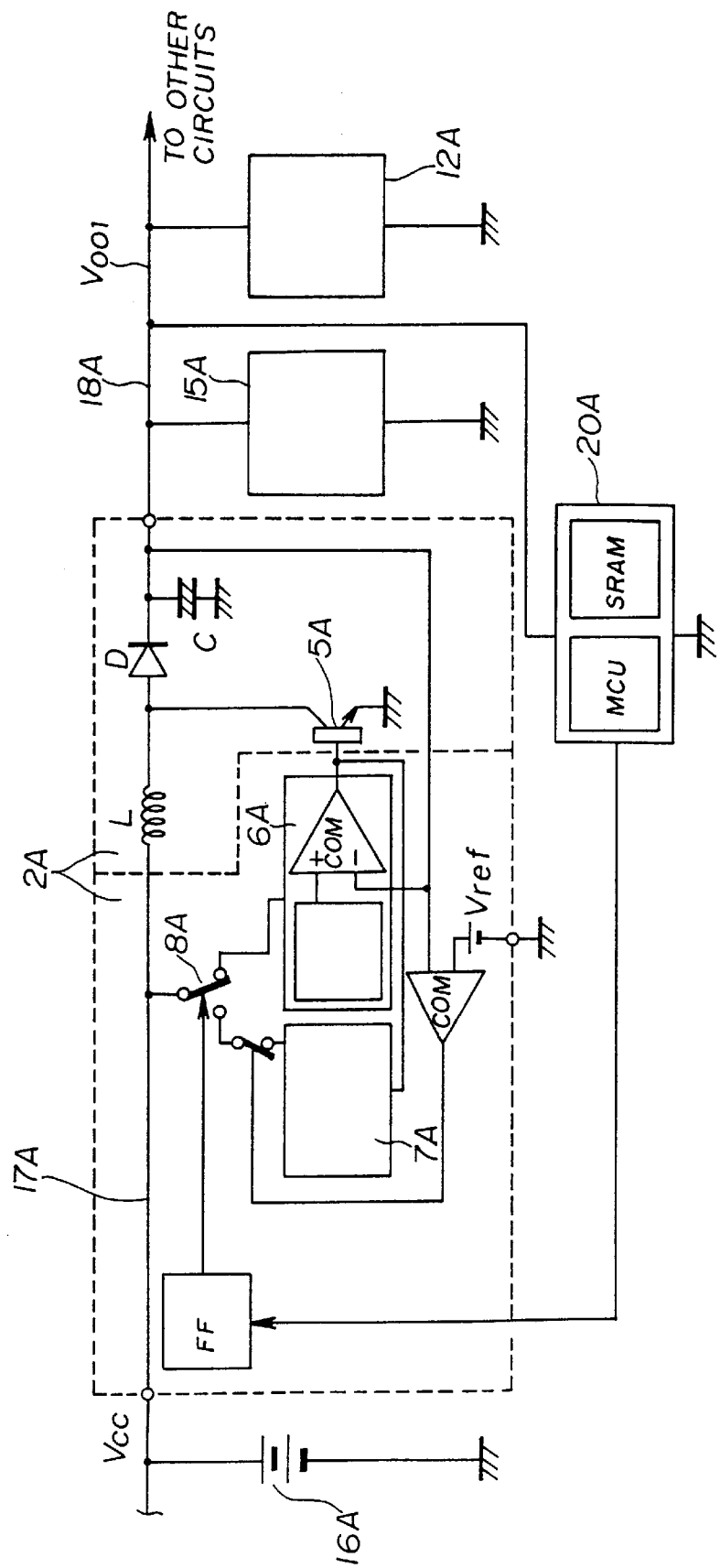
FIG. 1 shows a circuit diagram for illustrating a DC-DC converter in the prior art.
Figure 2:
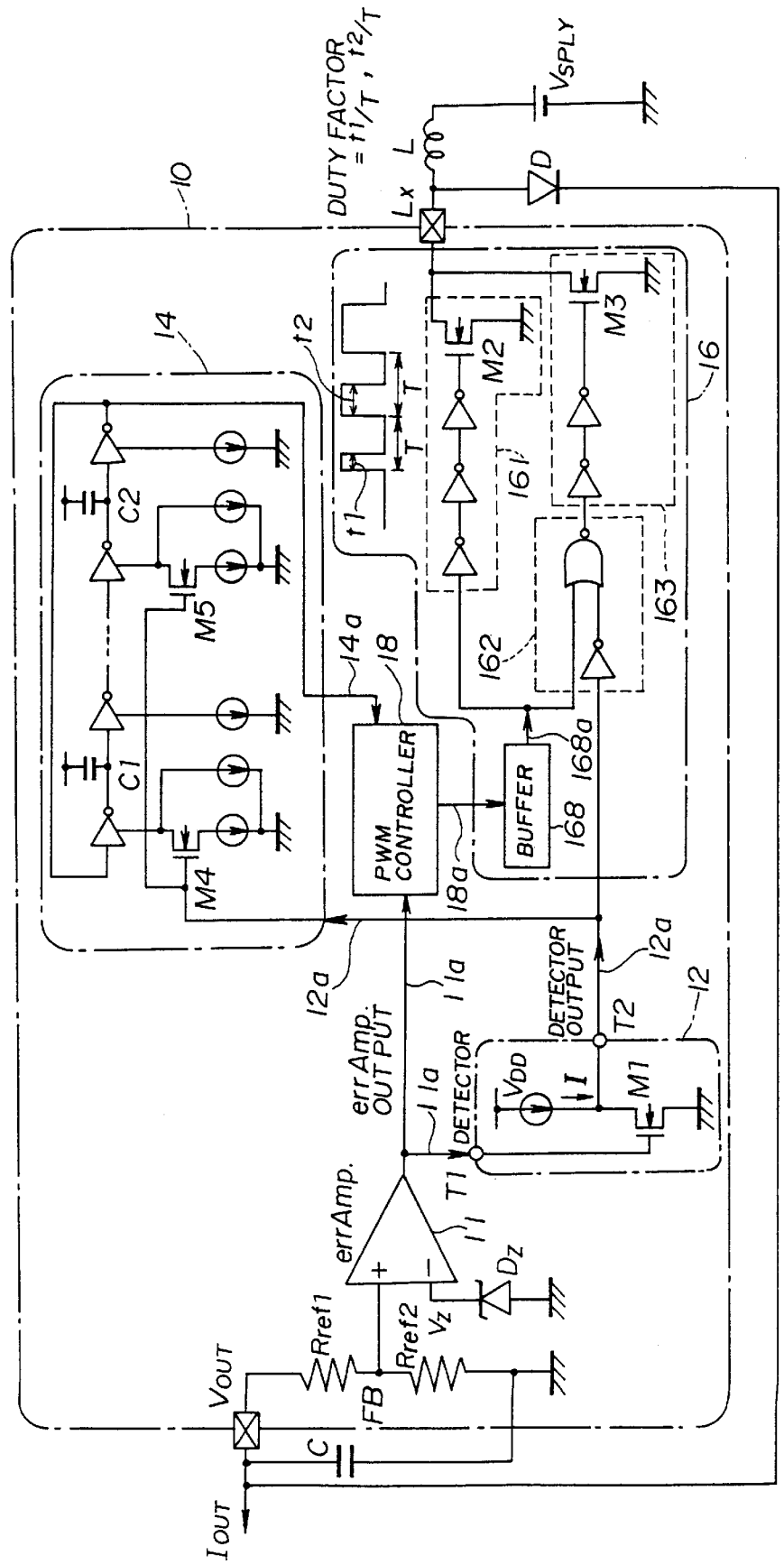
FIG. 2 shows a functional block diagram for illustrating a DC-DC converter in a first embodiment of the present invention.

FIG. 2 shows a functional block diagram of a DC-DC converter 10 in a first embodiment of the present invention.

The DC-DC converter 10 is a kind of a switching-type constant-voltage power supply (voltage regulator) in which switching control is performed on switching transistors M2 and M3 so that an external provision voltage $V_{SPLY}$, which is provided to a power-source connection terminal Lx via a constant-voltage generating inductor L from an external supply power source such as a lithium battery or the like, is converted into an output direct-current voltage $V_{OUT}$ of a constant voltage (having undergone voltage regulation) using a constant-voltage generating arrangement which includes the constant-voltage generating inductor L, a constant-voltage generating capacitor C and a rectifying diode D. This DC-DC converter can perform a pulse-width modulation (PWM) control in which a duty factor which is a ratio of the ON period (conduction period) to the total of the ON period and the OFF period (non-conduction period) of the switching transistors M2 and M3 is changed (see FIG. 2) so that the ON period of the switching transistors M2 and M3 is elongated when the load-side output direct-current voltage $V_{OUT}$ has decreased, and the ON period of the switching transistors M2 and M3 is shortened when the load-side output direct-current voltage $V_{OUT}$ has increased, in a condition in which the PWM control frequency f (the frequency of the pulse-width modulation control) at which the switching transistors M2 and M3 are turned on and turned off is kept constant, and, thereby, the load-side output direct-current voltage $V_{OUT}$ is controlled to be a fixed voltage.

Further, the DC-DC converter 10 shown in FIG. 2 can also perform the following control: The PWM control frequency f (the frequency of the pulse-width modulation control) at which the switching transistors M2 and M3 are turned on and turned off is decreased when the load-side output direct current $I_{OUT}$ has decreased to less than a predetermined value, and the pulse-width modulation (PWM) control is performed at the thus-decreased PWM control frequency f, in which control the load-side output direct-current voltage $V_{OUT}$ is controlled to be the constant voltage. On the other hand, the PWM control frequency f is not decreased while the load-side output direct current $I_{OUT}$ is kept equal to or above the predetermined value, and thus the pulse-width modulation (PWM) control is performed at the original PWM control frequency f, in which control the load-side output direct-current voltage $V_{OUT}$ is controlled to be the constant voltage.

This DC-DC converter 10 has a hardware arrangement which mainly includes a load-current detecting portion 12, an error detection amplification portion 11, a controller 18, a gate-size changing portion 16, a PWM-control-frequency generating oscillator 14 and a signal buffer 168.

The error detection amplification portion 11 shown in FIG. 2 is also called an error amplifier (errAmp), and has a function of detecting an amount of deviation of the value of the load-side output direct-current voltage $V_{OUT}$ from a target voltage value (which is the constant voltage value of the DC-DC converter 10), and, simultaneously, generating an error detection amplification signal 11a which is proportional to the above-mentioned amount of deviation. Actually, an operational amplifier is used as the error detection amplification portion 11.

With regard to the error detection amplification portion 11, voltage dividing is performed on the load-side output direct-current voltage $V_{OUT}$, using a reference resistance element $R_{ref1}$ and a reference resistance element $R_{ref2}$, according to a predetermined ratio ($=R_{ref2}/(R_{ref1}+R_{ref2})$). Thus, the feedback voltage (FB) ($=V_{OUT} \cdot R_{ref2}/(R_{ref1}+R_{ref2})$) is obtained. The error detection amplification portion has the thus-obtained feedback (FB) voltage inputted to the non-inverting input terminal (+) of the operational amplifier. Further, the error detection amplification portion 11 has the Zener voltage Vz of a Zener diode Dz, which has a function of providing a fixed voltage, inputted to the inverting input terminal of the operational amplifier. Then, the error detection amplification portion 11 detects the difference between the feedback voltage $V_{OUT} \cdot R_{ref2}/(R_{ref1}+R_{ref2})$ and the Zener voltage Vz, and outputs the error detection amplification signal 11a (output of the errAmp (error amplifier)) which is proportional to the amount of deviation of the value of the load-side output direct-current voltage $V_{OUT}$ from the target voltage value.

The PWM-control-frequency generating oscillator 14 has a ring oscillator as a basic circuit. The ring oscillator has a cascade connection of logic circuits, including MOSFETs M4 and M5, inverters (logic elements NOT), current sources and delay capacitors C1 and C2. When it is determined based on a load-light/heavy detection signal 12a (detector output in FIG. 2) that the load-side output direct current $I_{OUT}$ has decreased to less than the predetermined value, the PWM-control-frequency generating oscillator 14 generates a clock signal 14a for producing a PWM control signal specifying control parameters (specifically., the pulse width and pulse frequency) for performing the pulse-width modulation control in which control the PWM control frequency f at which the switching transistors M2 and M3 are turned on and turned off is low (in this embodiment, 30 kHz, for example). Further, when it is determined based on the load-light/heavy detection signal 12a that the load-side output direct current $I_{OUT}$ is kept equal to or above the predetermined value, the PWM-control-frequency generating oscillator 14 generates a different clock signal 14a for producing the PWM control signal specifying the control parameters for performing the pulse-width modulation control in which control the PWM control frequency f at which the switching transistors M2 and M3 are turned on and turned off is high (in this embodiment, 100 kHz, for example).

The load-current detecting portion 12 (detector in FIG. 2) shown in the figure detects whether power consumed in the load to which the load-side output direct-current voltage $V_{OUT}$ is provided is small or large, and simultaneously, generates the load-light/heavy detection signal 12a corresponding to whether the power is small or large.

The load-current detecting portion 12 contributes to the pulse-width modulation (PWM) control as follows: When the output current (load current) increases, the signal level of the errAmp output 11a shifts to a lower electric potential so as to increase the above-mentioned duty factor. At this time, a driver selecting portion 162 does not perform an operation of reducing the total gate size of the switching transistors M2 and M3. When the output current (load current) decreases, the signal level of the errAmp output 11a shifts to a higher electrical potential so as to reduce the above-mentioned duty factor. At this time, when the level of the errAmp output 11a becomes higher than a predetermined level, a constant-current inverter having a switching transistor M1 performs an inverting operation, that is, the switching transistor M1 is turned on. As a result, the gate electric potential of the switching transistor M3 is fixed to the ground electric potential (GND). Thereby, only the switching transistor M2 is actually activated. As a result, only the gate capacitance $C_{gate1}$ of the switching transistor M2 is charged and discharged. Therefore, in comparison to the case where both the switching transistors M2 and M3 are activated, it is possible to reduce the current amount needed for charging and discharging the gate capacitances $C_{gate1}$ and $C_{gate2}$ of the switching transistors M2 and M3. As a result, reduction of the consumed power in the switching transistors M2 and M3 can be achieved, and, thereby, high power-supply efficiency can be achieved, even at the time of a light load.

The power-supply efficiency can be calculated by the following expression:

[(output direct-current voltage $V_{OUT}$)×(output direct current $I_{OUT}$)]/[(external provision power source voltage $V_{SPLY}$)×(input current)]×100 (%).

The load-current detecting portion 12 further contributes to the pulse-width modulation (PWM) control as follows: When the output current (load current) $I_{OUT}$ is large, the signal level of the errAmp output 11a is a low level, and, thereby, the constant-current inverter having the switching transistor M1 does not perform the inverting operation, that is, is not turned on. As a result, the PWM control frequency f is not decreased. However, when the output current (load current) $I_{OUT}$ decreases, the signal level of the errAmp output 11a shifts to a higher electric potential. Then, when this level becomes more than the predetermined level, the constant-current inverter having the switching transistor M1 performs the inverting operation, and, thereby, the switching transistors M4 and M5 of the PWM-control-frequency generating oscillator 14 are turned off. As a result, the constant current values for discharging the delay capacitors C1 and C2, which values determine the PWM control frequency f, decrease. As a result, the PWM control frequency f decreases.

Thus, as a result of fixing the gate of the switching transistor M3 to the ground electric potential (GND), the current amount needed for charging and discharging the gate capacitances $C_{gate1}$ and $C_{gate2}$ of the switching transistors M2 and M3 which generate the load-side output direct-current voltage $V_{OUT}$, among the current amounts needed when the internal clock signal is generated, can be reduced. (Actually, because the switching transistor M3 has been deactivated, charging and discharging of the gate capacitance $C_{gate2}$ is not performed.) Further, as a result of the above-mentioned reduction of the PWM control frequency f, it is possible to reduce the number of times of charging and discharging the gate capacitances $C_{gate1}$ and $C_{gate2}$ of the switching transistors M2 and M3 per unit time. As a result, high power supply efficiency can be achieved even at the time of a light load.

Figure 3:
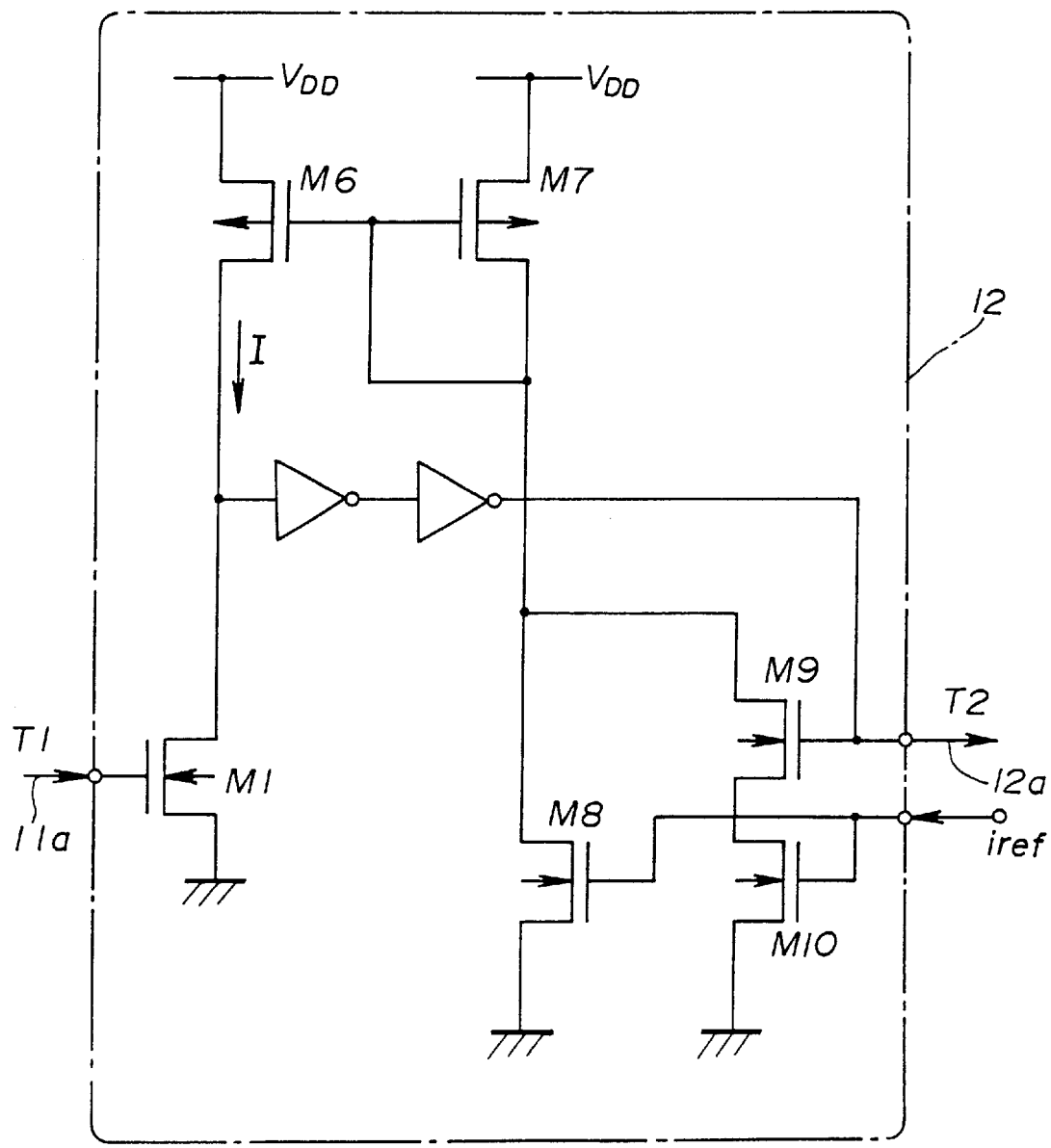
FIG. 3 shows a circuit diagram for illustrating one embodiment of a load-current detecting portion (detector), having a hysteresis characteristic, in the DC-DC converter shown in FIG. 2.

FIG. 3 shows a circuit diagram for illustrating one embodiment of the load-current detecting portion (detector) 12, having a hysteresis characteristic, in the DC-DC converter 10 shown in FIG. 2.

The load-current detecting portion 12 shown in FIG. 3 has a feature such that the determination level for determining whether power consumed in the load to which the load-side output direct-current voltage $V_{OUT}$ is provided is small or large has the hysteresis characteristic.

This hysteresis characteristic is achieved as follows:

In a current-mirror circuit having MOS transistors M6 and M7, in order to determine the current which is to flow through the MOS transistor M7, MOS transistors M8 and M10 are turned on using a reference voltage iref. Then, when the voltage at a terminal T1 (the signal level of the errAmp output 11a) increases and becomes more than the predetermined level (first threshold voltage), the MOS transistor M1 is turned on, and, thereby, the MOS transistor M9 is turned off. Then, when the voltage at the terminal T1 decreases and becomes less than another predetermined level (second threshold voltage), which predetermined level (second threshold level) is lower than the above-mentioned predetermined level (first threshold voltage), the MOS transistor M1 is turned off, and, thereby, the MOS transistor M9 is turned on.

Thus, the second threshold voltage at which the MOS transistor M1 is turned off when the voltage at the terminal T1 decreases is lower than the first threshold voltage at which the MOS transistor M1 is turned on when the voltage at the terminal T1 increases. This is because after the voltage at the terminal T1 decreases and becomes less than the second threshold level, the MOS transistor M1 is in the turned-off condition and the MOS transistor M9 is in the turned-on condition. As a result, the current which is to flow through the MOS transistor M7 is a total of the current flowing through the MOS transistor M8 and the current flowing through the MOS transistors M9 and M10. Thereby, the current I which is to flow through the MOS transistor M6 is larger in the current-mirror circuit having the MOS transistors M6 and M7. As a result, the first threshold voltage at which the MOS transistor M1 is turned on when the voltage at the terminal T1 increases is higher. After the voltage at the terminal T1 increases and becomes more than the first threshold level, the MOS transistor M1 is in the turned-on condition and the MOS transistor M9 is in the turned-off condition. As a result, the current which is to flow through the MOS transistor M7 is only the current flowing through the MOS transistor M8. Thereby, the current I which is to flow through the MOS transistor M6 is smaller in the current-mirror circuit having the MOS transistors M6 and M7. As a result, the second threshold voltage at which the MOS transistor M1 is turned off when the voltage at the terminal T1 decreases is lower. Thus, the determination level for determining whether power consumed in the load to which the load-side output direct-current voltage $V_{OUT}$ is provided is small or large has the hysteresis characteristic.

The controller 18 shown in FIG. 2 has a function of generating a load control signal 18a for the pulse-width modulation control in which the above-mentioned duty factor of the switching transistors M2 and M3 is changed so that the ON period of the switching transistors M2 and M3 is elongated when the controller 18 determines based on the errAmp output 11a that the load-side output direct-current voltage $V_{OUT}$ has decreased, and the ON period of the switching transistors M2 and M3 is shortened when the controller 18 determines based on the errAmp output 11a that the load-side output direct-current voltage $V_{OUT}$ has increased, in the condition in which the PWM control frequency f is kept constant.

The signal buffer 168 has a function of buffering of the load control signal 18a from the controller 18, thus obtaining a signal 168a and supplying the thus-obtained signal 168a to a first driver 161 and a driver selecting portion 162. The gate-size changing portion 16 shown in FIG. 2 has a hardware arrangement mainly including the first driver 161, a second driver 163, and the driver selecting portion 162, for achieving a function of performing control of reducing the total gate size of the switching transistors M2 and M3 at the time of a light load at which time the load current is small.

The first driver 161 shown in FIG. 2 has an n-channel MOSFET as the switching transistor M2, the drain of which is connected to the power-source connection terminal Lx, and the source of which is grounded, and a logic circuit having three inverters (logic elements NOT) connected in series. The signal 168a from the signal buffer 168 is inputted to the gate of the switching transistor M2 via this logic circuit.

The switching transistor M2 has a function of providing the load-side output direct-current voltage $V_{OUT}$ to the load according to the load control signal 18a.

The driver selecting portion 162 shown in FIG. 2 has an inverter (logical element NOT) to which the load-light/heavy detection signal 12a is inputted, and a logical element NOR which performs the logical NOR operation on the output of the inverter (logical element NOT) and the signal 168a from the signal buffer 168. The driver selecting portion 162 has a logical arrangement such as to supply the load control signal 18a to the second driver 163 for selecting and activating the switching transistor M3 according to the load-light/heavy detection signal 12a.

The second driver 163 shown in FIG. 2 has an n-channel MOSFET as the switching transistor M3, the drain of which is connected to the power-source connection terminal Lx, and the source of which is grounded, and a logic circuit having two inverters (logic elements NOT) connected in series. The logical output from the driver selecting portion 162 is inputted to the gate of the switching transistor M3 via this logic circuit.

The switching transistor M3 has the function of providing the load-side output direct-current voltage $V_{OUT}$ to the load according to the load control signal 18a.

Figure 4:
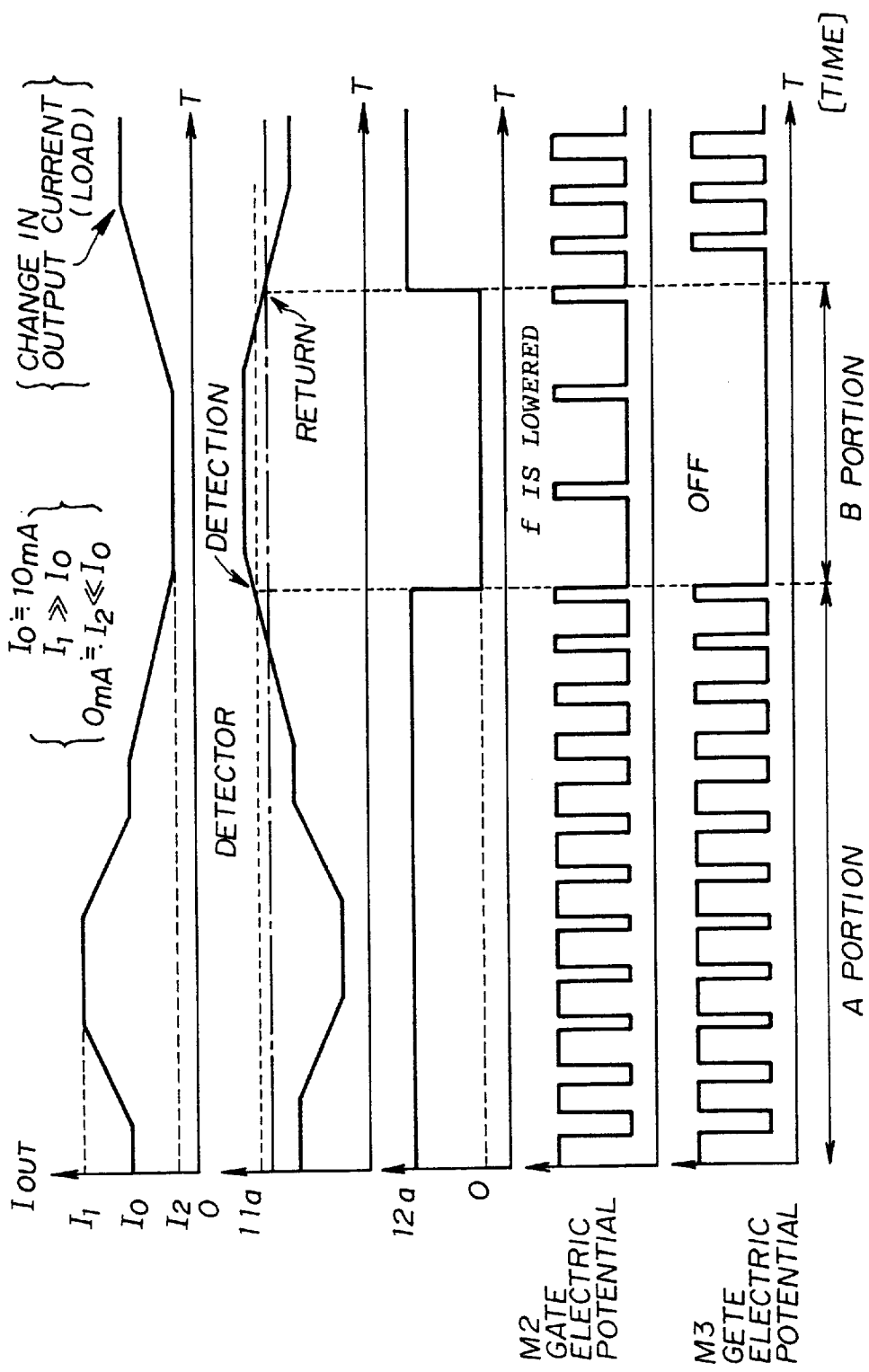
FIG. 4 shows a timing chart for illustrating a basic operation of the DC-DC converter shown in FIG. 2.

FIG. 4 shows a timing chart for illustrating a basic operation of the DC-DC converter 10 shown in FIG. 2.

As shown in FIG. 4, the load current $I_{OUT}$ which flows through the load to which the load-side output direct-current voltage $V_{OUT}$ is provided varies between a light load current $I_2$ and a heavy load current $I_1$. The load-current detecting portion (detector) 12 of the above-described DC-DC converter 10 detects whether power consumed in the load to which the load current $I_{OUT}$ is supplied is large or small. When detecting that the power is large, the load-current detecting portion 12 outputs the load-light/heavy detection signal 12a of an H (high) level. When detecting that the power is small, the load-current detecting portion 12 outputs the load-light/heavy detection signal 12a of an L (low) level. The horizontal axis T in FIG. 4 is the time axis.

The pulse-width modulation control is performed as follows: The controller 18 generates the load control signal 18a for the pulse-width modulation control for changing the above-mentioned duty factor of the switching transistors M2 and M3 so that the ON period of the switching transistors M2 and M3 is elongated when the controller 18 determines based on the signal level of the errAmp output 11a that the load-side output direct current $I_{OUT}$ has increased, and the ON period of the switching transistors M2 and M3 is shortened when the controller 18 determines based on the signal level of the errAmp output 11a that the load-side output direct current $I_{OUT}$ has decreased, in the condition in which the PWM control frequency f is kept constant.

The gate-size changing portion 16 selects, according to the load-light/heavy detection signal 12a, the switching transistor(s) M2 (and M3) to be activated, and the load control signal 18a is supplied to the gate terminal(s) of the thus-selected and activated switching transistor(s) M2 (and M3) (see M2 gate electric potential and M3 gate electric potential shown in FIG. 4).

Further, the pulse-width modulation (PWM) control is performed as follows: When the output current (load current) $I_{OUT}$ increases, the signal level of the errAmp output 11a is shifted to a lower electric potential so as to increase the above-mentioned duty factor, as shown in the A portion of FIG. 4. At this time, the driver selecting portion 162 does not perform an operation of reducing the total gate size of the switching transistors M2 and M3. When the output current (load current) $I_{OUT}$ decreases, the signal level of the errAmp output 11a is shifted to a higher electric potential so as to decrease the above-mentioned duty factor, as shown in the A portion of FIG. 4. At this time, when the level of the errAmp output 11a becomes higher than the predetermined level, the constant-current inverter having the switching transistor M1 performs the inverting operation, that is, the switching transistor M1 is turned on. As a result, the gate electric potential of the switching transistor M3 is fixed to the ground electric potential (GND). Thereby, only the switching transistor M2 is actually activated, as shown in the B portion of FIG. 4. As a result, only the gate capacitance $C_{gate1}$ of the switching transistor M2 is charged and discharged. Therefore, in comparison to the case where both the switching transistors M2 and M3 are activated, it is possible to reduce the current amount needed for charging and discharging the gate capacitances $C_{gate1}$ and $C_{gate2}$ of the switching transistors M2 and M3. As a result, reduction in the consumed power in the switching transistors M2 and M3 can be achieved, and, thereby, high power-supply efficiency can be achieved even at the time of a light load.

Further, the pulse-width modulation control is performed as follows: When the PWM-control-frequency generating oscillator 14 determines based on the load-light/heavy detection signal 12a that the load-side output direct current $I_{OUT}$ has decreased, that is, when the switching transistors M4 and M5 are turned off, the PWM-control-frequency generating oscillator 14 generates the clock signal 14a for generating the PWM control signal specifying the control parameters for performing the pulse-width modulation control in which control the PWM control frequency f for turning on and turning off the switching transistors M2 and M3 has been reduced (specifically, the frequency is reduced from 100 kHz→30 kHz, for example), as shown in the B portion of FIG. 4. When the PWM-control-frequency generating oscillator 14 determines based on the load-light/heavy detection signal 12a that the load-side output direct current $I_{OUT}$ does not decrease, that is, when the switching transistors M4 and M5 are not turned off, the PWM-control-frequency generating oscillator 14 generates the different clock signal 14a for generating the PWM control signal specifying the control parameters for performing the pulse-width modulation control in which control the PWM control frequency f for turning on and turning off the switching transistors M2 and M3 is not changed (specifically, the frequency is maintained at 100 kHz), as shown in the A portion of FIG. 4. As a result of the above-mentioned reduction in the PWM control frequency f, it is possible to reduce the number of times of charging and discharging the gate capacitances $C_{gate1}$ and $C_{gate2}$ of the switching transistors M2 and M3. As a result, high power-supply efficiency can be achieved even at the time of a light load.

Further, the error detection amplification portion 11 detects the amount of deviation of the value of the load-side output direct-current voltage $V_{OUT}$ from the target voltage value (which is the constant voltage value of the DC-DC converter 10), and, simultaneously, generates the errAmp output 11a which is proportional to the above-mentioned amount of deviation.

Further the controller 18 generates the load control signal 18a for the pulse-width modulation control for changing the above-mentioned duty factor of the switching transistors M2 and M3 so that the ON period of the switching transistors M2 and M3 is elongated when the controller 18 determines based on the signal level of the errAmp output 11a that the load-side output direct-current voltage $V_{OUT}$ has decreased, and the ON period of the switching transistors M2 and M3 is shortened when the controller 18 determines based on the signal level of the errAmp output 11a that the load-side output direct-current voltage $V_{OUT}$ has increased, in the condition in which the PWM control frequency f is kept constant.

Thus, the current amount needed for charging and discharging the gate capacitances $C_{gate1}$ and $C_{gate2}$ of the switching transistors M2 and M3 which generate the load-side output direct-current voltage $V_{OUT}$, among the current amounts needed when the internal clock signal is generated, can be reduced. Further, it is possible to reduce the number of times of charging and discharging the gate capacitances $C_{gate1}$ and $C_{gate2}$ of the switching transistors M2 and M3. As a result, high power supply efficiency can be achieved even at the time of a light load.

Figure 5:
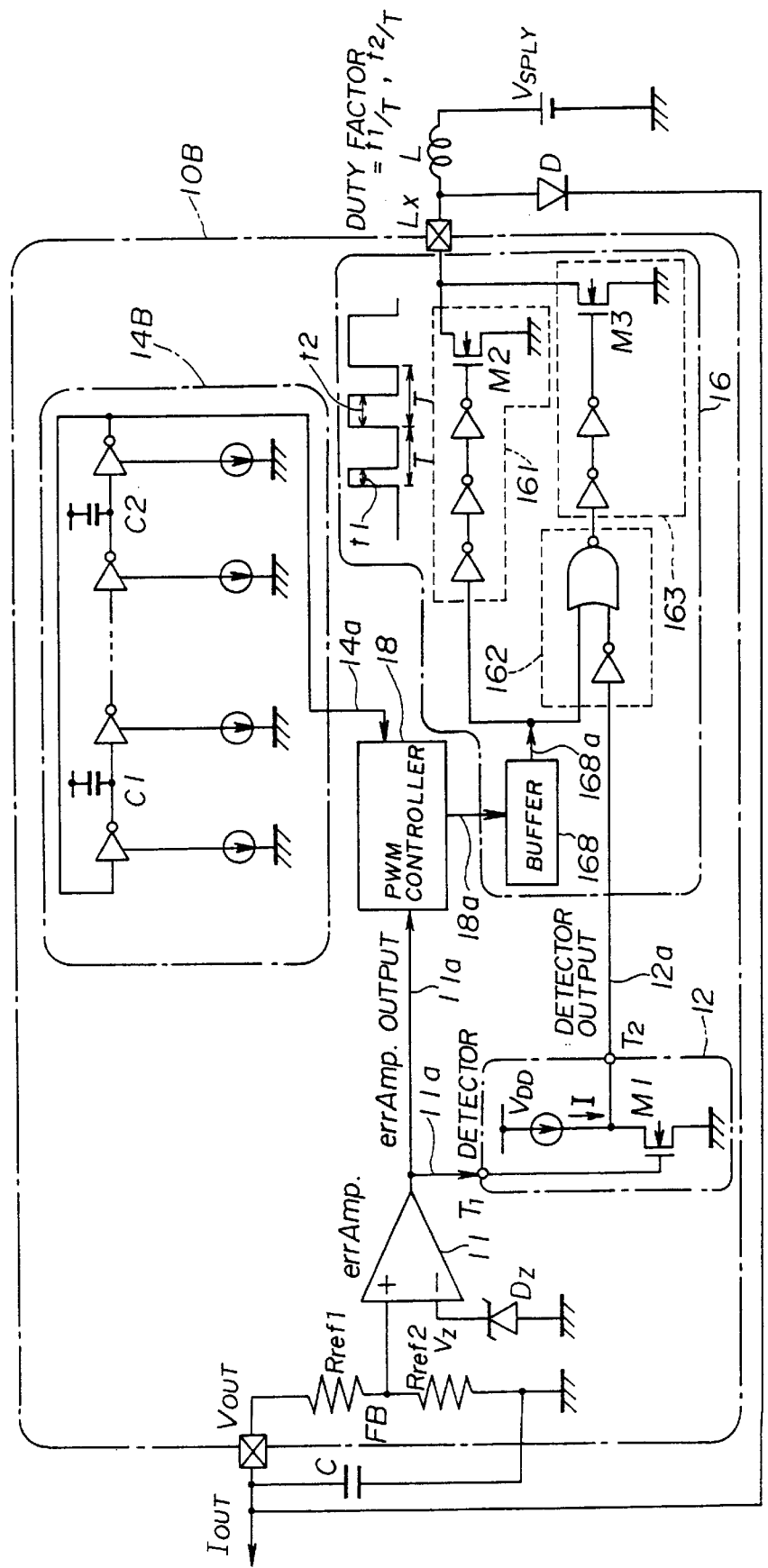
FIG. 5 shows a functional block diagram for illustrating a DC-DC converter in a second embodiment of the present invention.

FIG. 5 shows a functional block diagram of a DC-DC converter 10B in a second embodiment of the present invention. The same reference numerals are given to portions/components the same as those shown in FIG. 2. The same reference numeral with 'B' added thereto is given to a portion corresponding to that shown in FIG. 2.

The difference between the DC-DC converter 10 shown in FIG. 2 and the DC-DC converter 10B shown in FIG. 5 is that the switching transistors M4 and M5 of the PWM-control-frequency generating oscillator 14 are omitted in the DC-DC converter 10B shown in FIG. 5. Therefore, the PWM control frequency f of the PWM-control-frequency generating oscillator 14 is not changed.

In the DC-DC converter 10B shown in FIG. 5, the pulse-width modulation (PWM) control is performed as follows: When the output current (load current) $I_{OUT}$ increases, the signal level of the errAmp output 11a is shifted to a lower electric potential so as to increase the above-mentioned duty factor, as shown in the A portion of FIG. 4. At this time, the driver selecting portion 162 does not perform the operation of reducing the total gate size of the switching transistors M2 and M3. When the output current (load current) $I_{OUT}$ decreases, the signal level of the errAmp output 11a is shifted to a higher electric potential so as to decrease the above-mentioned duty factor, as shown in the A portion of FIG. 4. At this time, when the level of the errAmp output 11a becomes higher than the predetermined level, the constant-current inverter having the switching transistor M1 performs the inverting operation, that is, the switching transistor M1 is turned on. As a result, the gate electric potential of the switching transistor M3 is fixed to the ground electric potential (GND). Thereby, only the switching transistor M2 is actually activated, as shown in the B portion of FIG. 4. As a result, only the gate capacitance $C_{gate1}$ of the switching transistor M2 is charged and discharged. Therefore, in comparison to the case where both the switching transistors M2 and M3 are activated, it is possible to reduce the current amount needed for charging and discharging the gate capacitances $C_{gate1}$ and $C_{gate2}$ of the switching transistors M2 and M3. As a result, reduction of the consumed power in the switching transistors M2 and M3 can be achieved, and, thereby, high power supply efficiency can be achieved even at the time of a light load.

Figure 6:
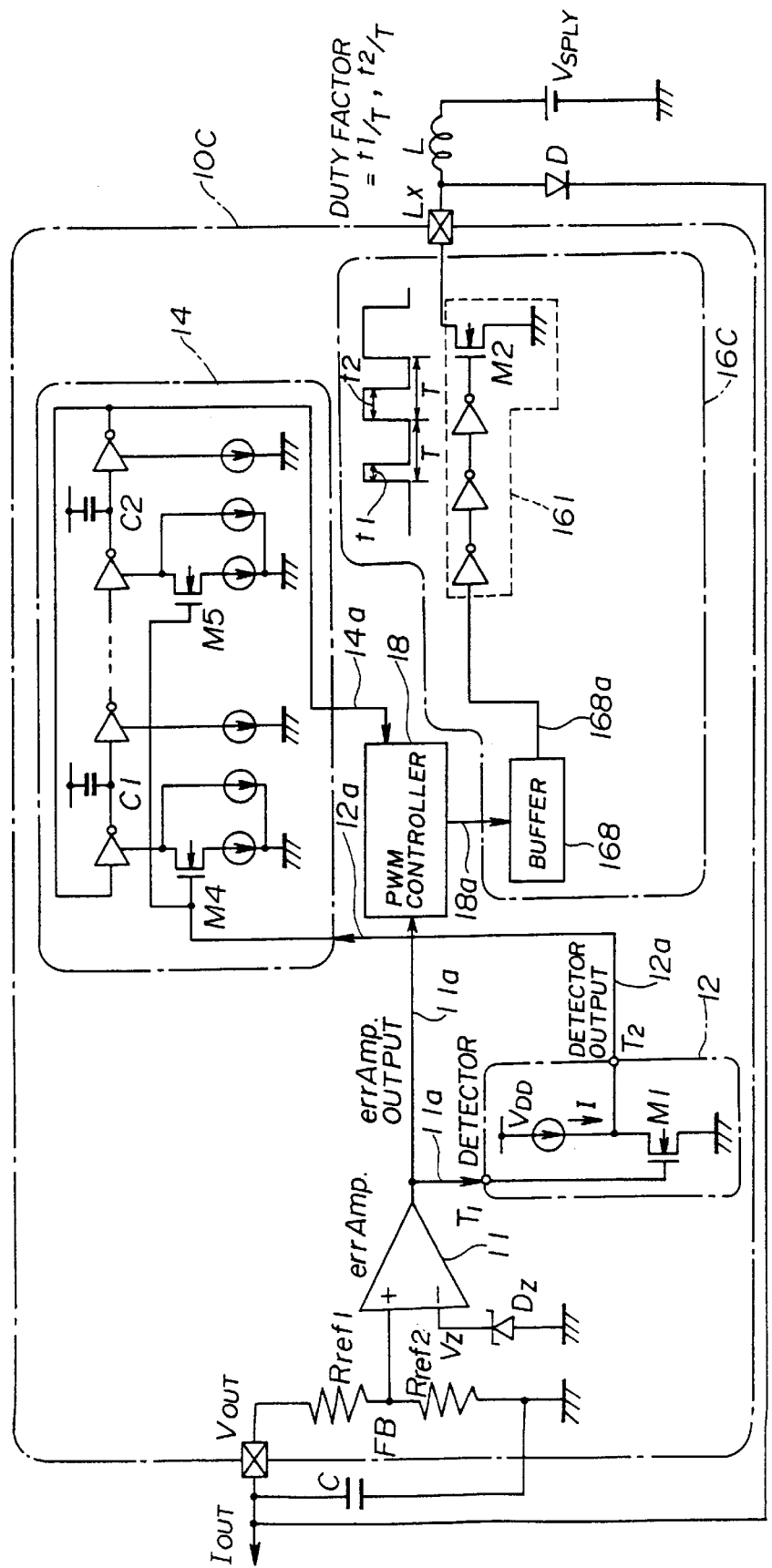
FIG. 6 shows a functional block diagram for illustrating a DC-DC converter in a third embodiment of the present invention.

FIG. 6 shows a functional block diagram of a DC-DC converter 10C in a third embodiment of the present invention. The same reference numerals are given to portions/components the same as those shown in FIG. 2. The same reference numeral with 'C' added thereto is given to a portion corresponding to that shown in FIG. 2.

The difference between the DC-DC converter 10 shown in FIG. 2 and the DC-DC converter 10C shown in FIG. 6 is that the driver selecting portion 162 and the second driver 163 of the gate-size changing portion 16 are omitted in the DC-DC converter 10C shown in FIG. 6. Therefore, the total gate size of the switching transistor (M2) in the gate changing portion is not changed.

In the DC-DC converter 10B shown in FIG. 6, the pulse-width modulation control is performed as follows: When the PWM-control-frequency generating oscillator 14 determines based on the load-light/heavy detection signal 12a that the load-side output direct current $I_{OUT}$ has decreased, that is, when the switching transistors M4 and M5 are turned off, the PWM-control-frequency generating oscillator 14 generates the clock signal 14a for generating the PWM control signal specifying the control parameters for performing the pulse-width modulation control in which control the PWM control frequency f for turning on and turning off the switching transistor M2 has been reduced (specifically, the frequency is reduced from 100 kHz→30 kHz, for example), as shown in the B portion of FIG. 4. When the PWM-control-frequency generating oscillator 14 determines based on the load-light/heavy detection signal 12a that the load-side output direct current $I_{OUT}$ does not decrease, that is, when the switching transistors M4 and M5 are not turned off, the PWM-control-frequency generating oscillator 14 generates a different clock signal 14a for generating the PWM control signal specifying the control parameters for performing the pulse-width modulation control in which control the PWM control frequency f for turning on and turning off the switching transistors M2 and M3 is not changed (specifically, the frequency is maintained at 100 kHz), as shown in the A portion of FIG. 4. As a result of the above-mentioned reduction of the PWM-control-frequency f, it is possible to reduce the number of times of charging and discharging the gate capacitance $C_{gate1}$ of the switching transistor M2. As a result, high power-supply efficiency can be achieved even at the time of a light load.

Further, the present invention is not limited to the above-described embodiments, and variations and modifications may be made without departing from the scope of the present invention.

The present application is based on Japanese priority application Nos. 10-198689 and 10-314160, filed on Jul. 14, 1998 and Nov. 5, 1998, respectively, the entire contents of which are hereby incorporated by reference.

What is claimed is:

1. A DC-DC converter which is a kind of a switching-type constant-voltage power supply in which switching control is performed on switching transistors so that an external supply voltage from an external supply power source is converted into a predetermined constant voltage, wherein a duty factor which is the ratio of the ON period to the total of the ON period and the OFF period of said switching transistors is changed so that the ON period is elongated when a load-side output direct-current voltage has decreased and the ON period is shortened when the load-side output direct-current voltage has increased, in a condition in which the switching frequency is kept constant, said DC-DC converter comprising:

load-current detecting means for detecting whether power consumed in a load to which the load-side output direct-current voltage is provided is large or small, and generating a load-light/heavy detection signal corresponding to whether said power is large or small;

error detection amplification means for detecting the amount of deviation of the value of the load-side output direct-current voltage from a target voltage value, and generating an error detection amplification signal corresponding to the amount of deviation;

controlling means for generating a load control signal for pulse-width modulation control for changing the duty factor of said switching transistors so that the ON period of said switching transistors is elongated when said controlling means determines based on the error detection amplification signal that the load-side output direct current has increased, and the ON period of said switching transistors is shortened when said controlling means determines based on the error detection amplification signal that the load-side output direct current has decreased, in the condition in which the switching frequency is kept constant;

the plurality of switching transistors, each of which is connected in parallel to the load, for providing the load-side output direct-current voltage to the load according to the load control signal; and driver selecting means for selecting, according to the load-light/heavy detection signal, the switching transistors to be activated, from among said plurality of switching transistors, and supplying the load control signal to the thus-selected switching transistor(s).

2. A DC-DC converter which is a kind of a switching-type constant-voltage power supply in which switching control is performed on switching transistors so that an external supply voltage from an external supply power source is converted into a predetermined constant voltage, wherein a duty factor which is the ratio of the ON period to the total of the ON period and the OFF period of said switching transistors is changed so that the ON period is elongated when a load-side output direct-current voltage has decreased and the ON period is shortened when the load-side output direct-current voltage has increased, in a condition in which the switching frequency is kept constant, said DC-DC converter comprising:

load-current detecting means for detecting whether power consumed in a load to which the load-side output direct-current voltage is provided is large or small, and generating a load-light/heavy detection signal corresponding to whether said power is large or small;

error detection amplification means for detecting the amount of deviation of the value of the load-side output direct-current voltage from a target voltage value, and generating an error detection amplification signal corresponding to the amount of deviation;

controlling means for generating a load control signal for pulse-width modulation control for changing the duty factor of said switching transistors so that the ON period of said switching transistors is elongated when said controlling means determines based on the error detection amplification signal that the load-side output direct current has increased, and the ON period of said switching transistors is shortened when said controlling means determines based on the error detection amplification signal that the load-side output direct current has decreased, in the condition in which the switching frequency is kept constant;

the plurality of switching transistors, each of which is connected in parallel to the load, for providing the load-side output direct-current voltage to the load according to the load control signal; and means for supplying the load control signal to, so as to activate, all of said plurality of switching transistors, when said load-light/heavy detection signal indicates that the power consumed in the load to which the load-side output direct-current voltage is provided is large, and supplying the load control signal to, so as to activate, all but one of said plurality of switching transistors when said load-light/heavy detection signal indicates that the power consumed in the load to which the load-side output direct-current voltage is provided is small.

3. A DC-DC converter which is a kind of a switching-type constant-voltage power supply in which switching control is performed on switching transistors so that an external supply voltage from an external supply power source is converted into a predetermined constant voltage, wherein a duty factor which is the ratio of the ON period to the total of the ON period and the OFF period of said switching transistors is changed so that the ON period is elongated when a load-side output direct-current voltage has decreased and the ON period is shortened when the load-side output direct-current voltage has increased, in a condition in which the switching frequency is kept constant, said DC-DC converter comprising:

load-current detecting means for detecting whether power consumed in a load to which the load-side output direct-current voltage is provided is large or small, and generating a load-light/heavy detection signal corresponding to whether said power is large or small;

error detection amplification means for detecting the amount of deviation of the value of the load-side output direct-current voltage from a target voltage value, and generating an error detection amplification signal corresponding to the amount of deviation;

controlling means for generating a load control signal for pulse-width modulation control for changing the duty factor of said switching transistors so that the ON period of said switching transistors is elongated when said controlling means determines based on the error detection amplification signal that the load-side output direct current has increased, and the ON period of said switching transistors is shortened when said controlling means determines based on the error detection amplification signal that the load-side output direct current has decreased, in the condition in which the switching frequency is kept constant;

the plurality of switching transistors, each of which is connected in parallel to the load, for providing the load-side output direct-current voltage to the load according to the load control signal; and means for supplying the load control signal to, so as to activate, all of said plurality of switching transistors, when said load-light/heavy detection signal indicates that the power consumed in the load to which the load-side output direct-current voltage is provided is large, and supplying the load control signal to, so as to activate, only one of said plurality of switching transistors, when said load-light/heavy detection signal indicates that the power consumed in the load to which the load-side output direct-current voltage is provided is small.

4. A DC-DC converter which is a kind of a switching-type constant-voltage power supply in which switching control is performed on switching transistors so that an external supply voltage from an external supply power source is converted into a predetermined constant voltage, wherein a duty factor which is the ratio of the ON period to the total of the ON period and the OFF period of said switching transistors is changed so that the ON period is elongated when a load-side output direct-current voltage has decreased and the ON period is shortened when the load-side output direct-current voltage has increased, in a condition in which the switching frequency is kept constant, said DC-DC converter comprising:

- load-current detecting means for detecting whether power consumed in a load to which the load-side output direct-current voltage is provided is large or small, and generating a load-light/heavy detection signal corresponding to whether said power is large or small;
- error detection amplification means for detecting the amount of deviation of the value of the load-side output direct-current voltage from a target voltage value, and generating an error detection amplification signal corresponding to the amount of deviation;
- controlling means for generating a load control signal for pulse-width modulation control for changing the duty factor of said switching transistors so that the ON period of said switching transistors is elongated when said controlling means determines based on the error detection amplification signal that the load-side output direct current has increased, and the ON period of said switching transistors is shortened when said controlling means determines based on the error detection amplification signal that the load-side output direct current has decreased, in the condition in which the switching frequency is kept constant;
- the plurality of switching transistors, each of which is connected in parallel to the load, for providing the load-side output direct-current voltage to the load according to the load control signal; and
- means for changing, according to the load-light/heavy detection signal, the number of switching transistors to be activated, from among said plurality of switching transistors, which number is at least one, the load control signal being supplied to said switching transistors to be activated.

5. A DC-DC converter which is a kind of a switching-type constant-voltage power supply in which switching control is performed on a switching transistor so that an external supply voltage from an external supply power source is converted into a predetermined constant voltage, wherein a duty factor which is the ratio of the ON period to the total of the ON period and the OFF period of said switching transistor is changed so that the ON period is elongated when a load-side output direct-current voltage has decreased and the ON period is shortened when the load-side output direct-current voltage has increased, said DC-DC converter comprising:

- load-current detecting means for detecting whether power consumed in a load to which the load-side output direct-current voltage is provided is large or small, and generating a load-light/heavy detection signal corresponding to whether said power is large or small;
- PWM-control-frequency generating oscillation means for generating a clock signal for generating a PWM control signal specifying control parameters for performing pulse-width modulation control in which control a PWM control frequency for turning on and turning off said switching transistor is low when said oscillation means determines, based on the load-light/heavy detection signal, that a load-side output direct current is small, and generating the clock signal for generating the PWM control signal specifying the control parameters for performing the pulse-width modulation control in which control the PWM control frequency for turning on and turning off said switching transistor is high when said oscillation means determines, based on the load-light/heavy detection signal, that the load-side output direct current is large;
- error detection amplification means for detecting the amount of deviation of the value of the load-side output direct-current voltage from a target voltage value, and generating an error detection amplification signal corresponding to the amount of deviation;
- controlling means for generating, based on the clock signal, a load control signal for pulse-width modulation control for changing the duty factor of said switching transistor so that the ON period of said switching transistor is elongated when said controlling means determines based on the error detection amplification signal that the load-side output direct current has increased, and the ON period of said switching transistor is shortened when said controlling means determines based on the error detection amplification signal that the load-side output direct current has decreased, in the condition in which the PWM control frequency is kept constant; and
- the at least one switching transistor for providing the load-side output direct-current voltage to the load according to the load control signal.

6. A DC-DC converter which is a kind of a switching-type constant-voltage power supply in which switching control is performed on switching transistors so that an external supply voltage from an external supply power source is converted into a predetermined constant voltage, wherein a duty factor which is the ratio of the ON period to the total of the ON period and the OFF period of said switching transistors is changed so that the ON period is elongated when a load-side output direct-current voltage has decreased and the ON period is shortened when the load-side output direct-current voltage has increased, said DC-DC converter comprising:

- load-current detecting means for detecting whether power consumed in a load to which the load-side output direct-current voltage is provided is large or small, and generating a load-light/heavy detection signal corresponding to whether said power is large or small;
- PWM-control-frequency generating oscillation means for generating a clock signal for generating a PWM control signal specifying control parameters for performing pulse-width modulation control in which control a PWM control frequency for turning on and turning off said switching transistors is low when said oscillation means determines, based on the load-light/heavy detection signal, that a load-side output direct current is small, and generating the clock signal for generating the PWM control signal specifying the control parameters for performing the pulse-width modulation control in which control the PWM control frequency for turning on and turning off said switching transistors is high when said oscillation means determines, based on the load-light/heavy detection signal, that the load-side output direct current is large;
- error detection amplification means for detecting the amount of deviation of the value of the load-side output direct-current voltage from a target voltage value, and generating an error detection amplification signal corresponding to the amount of deviation;
- controlling means for generating, based on the clock signal, a load control signal for pulse-width modulation control for changing the duty factor of said switching transistors so that the ON period of said switching transistors is elongated when said controlling means determines based on the error detection amplification signal that the load-side output direct current has increased, and the ON period of said switching transistors is shortened when said controlling means determines based on the error detection amplification signal that the load-side output direct current has decreased, in the condition in which the PWM control frequency is kept constant;

the plurality of switching transistors, each of which is connected in parallel to the load, for providing the load-side output direct-current voltage to the load according to the load control signal; and driver selecting means for selecting, according to the load-light/heavy detection signal, the switching transistor(s) to be activated, from among said plurality of switching transistors, and supplying the load control signal to the thus-selected switching transistor(s).

7. A DC-DC converter which is a kind of a switching-type constant-voltage power supply in which switching control is performed on switching transistors so that an external supply voltage from an external supply power source is converted into a predetermined constant voltage, wherein a duty factor which is the ratio of the ON period to the total of the ON period and the OFF period of said switching transistors is changed so that the ON period is elongated when a load-side output direct-current voltage has decreased and the ON period is shortened when the load-side output direct-current voltage has increased, said DC-DC converter comprising:

load-current detecting means for detecting whether power consumed in a load to which the load-side output direct-current voltage is provided is large or small, and generating a load-light/heavy detection signal corresponding to whether said power is large or small;

PWM-control-frequency generating oscillation means for generating a clock signal for generating a PWM control signal specifying control parameters for performing pulse-width modulation control in which control a PWM control frequency for turning on and turning off said switching transistors is low when said oscillation means determines, based on the load-light/heavy detection signal, that a load-side output direct current is small, and generating the clock signal for generating the PWM control signal specifying the control parameters for performing the pulse-width modulation control in which control the PWM control frequency for turning on and turning off said switching transistors is high when said oscillation means determines, based on the load-light/heavy detection signal, that the load-side output direct current is large;

error detection amplification means for detecting the amount of deviation of the value of the load-side output direct-current voltage from a target voltage value, and generating an error detection amplification signal corresponding to the amount of deviation;

controlling means for generating, based on the clock signal, a load control signal for pulse-width modulation control for changing the duty factor of said switching transistors so that the ON period of said switching transistors is elongated when said controlling means determines based on the error detection amplification signal that the load-side output direct current has increased, and the ON period of said switching transistors is shortened when said controlling means determines based on the error detection amplification signal that the load-side output direct current has decreased, in the condition in which the PWM control frequency is kept constant;

the plurality of switching transistors, each of which is connected in parallel to the load, for providing the load-side output direct-current voltage to the load according to the load control signal; and means for supplying the load control signal to, so as to activate, all of said plurality of switching transistors, when said load-light/heavy detection signal indicates that the power consumed in the load to which the load-side output direct-current voltage is provided is large, and supplying the load control signal to, so as to activate, all but one of said plurality of switching transistors, when said load-light/heavy detection signal indicates that the power consumed in the load to which the load-side output direct-current voltage is provided is small.

8. A DC-DC converter which is a kind of a switching-type constant-voltage power supply in which switching control is performed on switching transistors so that an external supply voltage from an external supply power source is converted into a predetermined constant voltage, wherein a duty factor which is the ratio of the ON period to the total of the ON period and the OFF period of said switching transistors is changed so that the ON period is elongated when a load-side output direct-current voltage has decreased and the ON period is shortened when the load-side output direct-current voltage has increased, said DC-DC converter comprising:

load-current detecting means for detecting whether power consumed in a load to which the load-side output direct-current voltage is provided is large or small, and generating a load-light/heavy detection signal corresponding to whether said power is large or small;

PWM-control-frequency generating oscillation means for generating a clock signal for generating a PWM control signal specifying control parameters for performing pulse-width modulation control in which control a PWM control frequency for turning on and turning off said switching transistors is low when said oscillation means determines, based on the load-light/heavy detection signal, that a load-side output direct current is small, and generating the clock signal for generating the PWM control signal specifying the control parameters for performing the pulse-width modulation control in which control the PWM control frequency for turning on and turning off said switching transistors is high when said oscillation means determines, based on the load-light/heavy detection signal, that the load-side output direct current is large;

error detection amplification means for detecting the amount of deviation of the value of the load-side output direct-current voltage from a target voltage value, and generating an error detection amplification signal corresponding to the amount of deviation;

controlling means for generating, based on the clock signal, a load control signal for pulse-width modulation control for changing the duty factor of said switching transistors so that the ON period of said switching transistors is elongated when said controlling means determines based on the error detection amplification signal that the load-side output direct current has increased, and the ON period of said switching transistors is shortened when said controlling means determines based on the error detection amplification signal that the load-side output direct current has decreased, in the condition in which the PWM control frequency is kept constant;

the plurality of switching transistors, each of which is connected in parallel to the load, for providing the load-side output direct-current voltage to the load according to the load control signal; and means for supplying the load control signal to, so as to activate, all of said plurality of switching transistors, when said load-light/heavy detection signal indicates that the power consumed in the load to which the load-side output direct-current voltage is provided is large, and supplying the load control signal to, so as to activate, only one of said plurality of switching transistors, when said load-light/heavy detection signal indicates that the power consumed in the load to which the load-side output direct-current voltage is provided is small.

9. A DC-DC converter which is a kind of a switching-type constant-voltage power supply in which switching control is performed on switching transistors so that an external supply voltage from an external supply power source is converted into a predetermined constant voltage, wherein a duty factor which is the ratio of the ON period to the total of the ON period and the OFF period of said switching transistors is changed so that the ON period is elongated when a load-side output direct-current voltage has decreased and the ON period is shortened when the load-side output direct-current voltage has increased, said DC-DC converter comprising:

load-current detecting means for detecting whether power consumed in a load to which the load-side output direct-current voltage is provided is large or small, and generating a load-light/heavy detection signal corresponding to whether said power is large or small;

PWM-control-frequency generating oscillation means for generating a clock signal for generating a PWM control signal specifying control parameters for performing pulse-width modulation control in which control a PWM control frequency for turning on and turning off said switching transistors is low when said oscillation means determines, based on the load-light/heavy detection signal, that a load-side output direct current is small, and generating the clock signal for generating the PWM control signal specifying the control parameters for performing the pulse-width modulation control in which control the PWM control frequency for turning on and turning off said switching transistors is high when said oscillation means determines, based on the load-light/heavy detection signal, that the load-side output direct current is large;

error detection amplification means for detecting the amount of deviation of the value of the load-side output direct-current voltage from a target voltage value, and generating an error detection amplification signal corresponding to the amount of deviation;

controlling means for generating, based on the clock signal, a load control signal for pulse-width modulation control for changing the duty factor of said switching transistors so that the ON period of said switching transistors is elongated when said controlling means determines based on the error detection amplification signal that the load-side output direct current has increased, and the ON period of said switching transistors is shortened when said controlling means determines based on the error detection amplification signal that the load-side output direct current has decreased, in the condition in which the PWM control frequency is kept constant;

the plurality of switching transistors, each of which is connected in parallel to the load, for providing the load-side output direct-current voltage to the load according to the load control signal; and means for changing, according to the load-light/heavy detection signal, the number of switching transistors to be activated, from among said plurality of switching transistors, which number is at least one, the load control signal being supplied to said switching transistors to be activated.

10. A DC-DC converter which is a kind of a switching-type constant-voltage power supply in which switching control is performed on switching transistors so that an external supply voltage from an external supply power source is converted into a predetermined constant voltage, wherein a duty factor which is the ratio of the ON period to the total of the ON period and the OFF period of said switching transistors is changed so that the ON period is elongated when a load-side output direct-current voltage has decreased and the ON period is shortened when the load-side output direct-current voltage has increased, in a condition in which the switching frequency is kept constant, said DC-DC converter comprising:

a load-current detecting portion which detects whether power consumed in a load to which the load-side output direct-current voltage is provided is large or small, and generates a load-light/heavy detection signal corresponding to whether said power is large or small;

an error detection amplification portion which detects the amount of deviation of the value of the load-side output direct-current voltage from a target voltage value, and generates an error detection amplification signal corresponding to the amount of deviation;

a controller which generates a load control signal for pulse-width modulation control for changing the duty factor of said switching transistors so that the ON period of said switching transistors is elongated when said controller determines based on the error detection amplification signal that the load-side output direct current has increased, and the ON period of said switching transistors is shortened when said controller determines based on the error detection amplification signal that the load-side output direct current has decreased, in the condition in which the switching frequency is kept constant;

the plurality of switching transistors, each of which is connected in parallel to the load, for providing the load-side output direct-current voltage to the load according to the load control signal; and a driver selecting portion which selects, according to the load-light/heavy detection signal, the switching transistor(s) to be activated, from among said plurality of switching transistors, and supplies the load control signal to the thus-selected switching transistor(s).

11. A DC-DC converter which is a kind of a switching-type constant-voltage power supply in which switching control is performed on switching transistors so that an external supply voltage from an external supply power source is converted into a predetermined constant voltage, wherein a duty factor which is the ratio of the ON period to the total of the ON period and the OFF period of said switching transistors is changed so that the ON period is elongated when a load-side output direct-current voltage has decreased and the ON period is shortened when the load-side output direct-current voltage has increased, in a condition in which the switching frequency is kept constant, said DC-DC converter comprising:

a load-current detecting portion which detects whether power consumed in a load to which the load-side output direct-current voltage is provided is large or small, and generates a load-light/heavy detection signal corresponding to whether said power is large or small;

an error detection amplification portion which detects the amount of deviation of the value of the load-side output direct-current voltage from a target voltage value, and generates an error detection amplification signal corresponding to the amount of deviation;

a controller which generates a load control signal for pulse-width modulation control for changing the duty factor of said switching transistors so that the ON period of said switching transistors is elongated when said controller determines based on the error detection amplification signal that the load-side output direct current has increased, and the ON period of said switching transistors is shortened when said controller determines based on the error detection amplification signal that the load-side output direct current has decreased, in the condition in which the switching frequency is kept constant;

the plurality of switching transistors, each of which is connected in parallel to the load, for providing the load-side output direct-current voltage to the load according to the load control signal; and a portion which supplies the load control signal to, so as to activate, all of said plurality of switching transistors, when said load-light/heavy detection signal indicates that the power consumed in the load to which the load-side output direct-current voltage is provided is large, and supplies the load control signal to, so as to activate, all but one of said plurality of switching transistors when said load-light/heavy detection signal indicates that the power consumed in the load to which the load-side output direct-current voltage is provided is small.

12. A DC-DC converter which is a kind of a switching-type constant-voltage power supply in which switching control is performed on switching transistors so that an external supply voltage from an external supply power source is converted into a predetermined constant voltage, wherein a duty factor which is the ratio of the ON period to the total of the ON period and the OFF period of said switching transistors is changed so that the ON period is elongated when a load-side output direct-current voltage has decreased and the ON period is shortened when the load-side output direct-current voltage has increased, in a condition in which the switching frequency is kept constant, said DC-DC converter comprising:

a load-current detecting portion which detects whether power consumed in a load to which the load-side output direct-current voltage is provided is large or small, and generates a load-light/heavy detection signal corresponding to whether said power is large or small;

an error detection amplification portion which detects the amount of deviation of the value of the load-side output direct-current voltage from a target voltage value, and generates an error detection amplification signal corresponding to the amount of deviation;

a controller which generates a load control signal for pulse-width modulation control for changing the duty factor of said switching transistors so that the ON period of said switching transistors is elongated when said controller determines based on the error detection amplification signal that the load-side output direct current has increased, and the ON period of said switching transistors is shortened when said controller determines based on the error detection amplification signal that the load-side output direct current has decreased, in the condition in which the switching frequency is kept constant;

the plurality of switching transistors, each of which is connected in parallel to the load, for providing the load-side output direct-current voltage to the load according to the load control signal; and a portion which supplies the load control signal to, so as to activate, all of said plurality of switching transistors, when said load-light/heavy detection signal indicates that the power consumed in the load to which the load-side output direct-current voltage is provided is large, and supplies the load control signal to, so as to activate, only one of said plurality of switching transistors, when said load-light/heavy detection signal indicates that the power consumed in the load to which the load-side output direct-current voltage is provided is small.

13. A DC-DC converter which is a kind of a switching-type constant-voltage power supply in which switching control is performed on switching transistors so that an external supply voltage from an external supply power source is converted into a predetermined constant voltage, wherein a duty factor which is the ratio of the ON period to the total of the ON period and the OFF period of said switching transistors is changed so that the ON period is elongated when a load-side output direct-current voltage has decreased and the ON period is shortened when the load-side output direct-current voltage has increased, in a condition in which the switching frequency is kept constant, said DC-DC converter comprising:

a load-current detecting portion which detects whether power consumed in a load to which the load-side output direct-current voltage is provided is large or small, and generates a load-light/heavy detection signal corresponding to whether said power is large or small;

an error detection amplification portion which detects the amount of deviation of the value of the load-side output direct-current voltage from a target voltage value, and generates an error detection amplification signal corresponding to the amount of deviation;

a controller which generates a load control signal for pulse-width modulation control for changing the duty factor of said switching transistors so that the ON period of said switching transistors is elongated when said controller determines based on the error detection amplification signal that the load-side output direct current has increased, and the ON period of said switching transistors is shortened when said controller determines based on the error detection amplification signal that the load-side output direct current has decreased, in the condition in which the switching frequency is kept constant;

the plurality of switching transistors, each of which is connected in parallel to the load, for providing the load-side output direct-current voltage to the load according to the load control signal; and a portion which changes, according to the load-light/heavy detection signal, the number of switching transistors to be activated, from among said plurality of switching transistors, which number is at least one, the load control signal being supplied to said switching transistors to be activated.

14. A DC-DC converter which is a kind of a switching-type constant-voltage power supply in which switching control is performed on a switching transistor so that an external supply voltage from an external supply power source is converted into a predetermined constant voltage, wherein a duty factor which is the ratio of the ON period to the total of the ON period and the OFF period of said switching transistor is changed so that the ON period is elongated when a load-side output direct-current voltage has decreased and the ON period is shortened when the load-side output direct-current voltage has increased, said DC-DC converter comprising:

a load-current detecting portion which detects whether power consumed in a load to which the load-side output direct-current voltage is provided is large or small, and generates a load-light/heavy detection signal corresponding to whether said power is large or small;

a PWM-control-frequency generating oscillator which generates a clock signal for generating a PWM control signal specifying control parameters for performing pulse-width modulation control in which control a PWM control frequency for turning on and turning off said switching transistor is low when said oscillator determines, based on the load-light/heavy detection signal, that a load-side output direct current is small, and generates the clock signal for generating the PWM control signal specifying the control parameters for performing the pulse-width modulation control in which control the PWM control frequency for turning on and turning off said switching transistor is high when said oscillator determines, based on the load-light/heavy detection signal, that the load-side output direct current is large;

an error detection amplification portion which detects the amount of deviation of the value of the load-side output direct-current voltage from a target voltage value, and generates an error detection amplification signal corresponding to the amount of deviation;

a controller which generates, based on the clock signal, a load control signal for pulse-width modulation control for changing the duty factor of said switching transistor so that the ON period of said switching transistor is elongated when said controller determines based on the error detection amplification signal that the load-side output direct current has increased, and the ON period of said switching transistor is shortened when said controller determines based on the error detection amplification signal that the load-side output direct current has decreased, in the condition in which the PWM control frequency is kept constant; and the at least one switching transistor for providing the load-side output direct-current voltage to the load according to the load control signal.

15. A DC-DC converter which is a kind of a switching-type constant-voltage power supply in which switching control is performed on switching transistors so that an external supply voltage from an external supply power source is converted into a predetermined constant voltage, wherein a duty factor which is the ratio of the ON period to the total of the ON period and the OFF period of said switching transistors is changed so that the ON period is elongated when a load-side output direct-current voltage has decreased and the ON period is shortened when the load-side output direct-current voltage has increased, said DC-DC converter comprising:

a load-current detecting portion which detects whether power consumed in a load to which the load-side output direct-current voltage is provided is large or small, and generates a load-light/heavy detection signal corresponding to whether said power is large or small;

a PWM-control-frequency generating oscillator which generates a clock signal for generating a PWM control signal specifying control parameters for performing pulse-width modulation control in which control a PWM control frequency for turning on and turning off said switching transistors is low when said oscillator determines, based on the load-light/heavy detection signal, that a load-side output direct current is small, and generates the clock signal for generating the PWM control signal specifying the control parameters for performing the pulse-width modulation control in which control the PWM control frequency for turning on and turning off said switching transistors is high when said oscillator determines, based on the load-light/heavy detection signal, that the load-side output direct current is large;

an error detection amplification portion which detects the amount of deviation of the value of the load-side output direct-current voltage from a target voltage value, and generates an error detection amplification signal corresponding to the amount of deviation;

a controller which generates, based on the clock signal, a load control signal for pulse-width modulation control for changing the duty factor of said switching transistors so that the ON period of said switching transistors is elongated when said controller determines based on the error detection amplification signal that the load-side output direct current has increased, and the ON period of said switching transistors is shortened when said controller determines based on the error detection amplification signal that the load-side output direct current has decreased, in the condition in which the PWM control frequency is kept constant;

the plurality of switching transistors, each of which is connected in parallel to the load, for providing the load-side output direct-current voltage to the load according to the load control signal; and a driver selecting portion which selects, according to the load-light/heavy detection signal, the switching transistor(s) to be activated, from among said plurality of switching transistors, and supplies the load control signal to the thus-selected switching transistor(s).

16. A DC-DC converter which is a kind of a switching-type constant-voltage power supply in which switching control is performed on switching transistors so that an external supply voltage from an external supply power source is converted into a predetermined constant voltage, wherein a duty factor which is the ratio of the ON period to the total of the ON period and the OFF period of said switching transistors is changed so that the ON period is elongated when a load-side output direct-current voltage has decreased and the ON period is shortened when the load-side output direct-current voltage has increased, said DC-DC converter comprising:

a load-current detecting portion which detects whether power consumed in a load to which the load-side output direct-current voltage is provided is large or small, and generates a load-light/heavy detection signal corresponding to whether said power is large or small;

a PWM-control-frequency generating oscillator which generates a clock signal for generating a PWM control signal specifying control parameters for performing pulse-width modulation control in which control a PWM control frequency for turning on and turning off said switching transistors is low when said oscillator determines, based on the load-light/heavy detection signal, that a load-side output direct current is small, and generates the clock signal for generating the PWM control signal specifying the control parameters for performing the pulse-width modulation control in which control the PWM control frequency for turning on and turning off said switching transistors is high when said oscillator determines, based on the load-light/heavy detection signal, that the load-side output direct current is large;

an error detection amplification portion which detects the amount of deviation of the value of the load-side output direct-current voltage from a target voltage value, and generates an error detection amplification signal corresponding to the amount of deviation;

a controller which generates, based on the clock signal, a load control signal for pulse-width modulation control for changing the duty factor of said switching transistors so that the ON period of said switching transistors is elongated when said controller determines based on the error detection amplification signal that the load-side output direct current has increased, and the ON period of said switching transistors is shortened when said controller determines based on the error detection amplification signal that the load-side output direct current has decreased, in the condition in which the PWM control frequency is kept constant;

the plurality of switching transistors, each of which is connected in parallel to the load, for providing the load-side output direct-current voltage to the load according to the load control signal; and a portion which supplies the load control signal to, so as to activate, all of said plurality of switching transistors, when said load-light/heavy detection signal indicates that the power consumed in the load to which the load-side output direct-current voltage is provided is large, and supplies the load control signal to, so as to activate, all but one of said plurality of switching transistors when said load-light/heavy detection signal indicates that the power consumed in the load to which the load-side output direct-current voltage is provided is small.

17. A DC-DC converter which is a kind of a switching-type constant-voltage power supply in which witching control is performed on switching transistors so that an external supply voltage from an external supply power source is converted into a predetermined constant voltage, wherein a duty factor which is the ratio of the ON period to the total of the ON period and the OFF period of said switching transistors is changed so that the ON period is elongated when a load-side output direct-current voltage has decreased and the ON period is shortened when the load-side output direct-current voltage has increased, said DC-DC converter comprising:

a load-current detecting portion which detects whether power consumed in a load to which the load-side output direct-current voltage is provided is large or small, and generates a load-light/heavy detection signal corresponding to whether said power is large or small;

a PWM-control-frequency generating oscillator which generates a clock signal for generating a PWM control signal specifying control parameters for performing pulse-width modulation control in which control a PWM control frequency for turning on and turning off said switching transistors is low when said oscillator determines, based on the load-light/heavy detection signal, that a load-side output direct current is small, and generates the clock signal for generating the PWM control signal specifying the control parameters for performing the pulse-width modulation control in which control the PWM control frequency for turning on and turning off said switching transistors is high when said oscillator determines, based on the load-light/heavy detection signal, that the load-side output direct current is large;

an error detection amplification portion which detects the amount of deviation of the value of the load-side output direct-current voltage from a target voltage value, and generates an error detection amplification signal corresponding to the amount of deviation;

a controller which generates, based on the clock signal, a load control signal for pulse-width modulation control for changing the duty factor of said switching transistors so that the ON period of said switching transistors is elongated when said controller determines based on the error detection amplification signal that the load-side output direct current has increased, and the ON period of said switching transistors is shortened when said controller determines based on the error detection amplification signal that the load-side output direct current has decreased, in the condition in which the PWM control frequency is kept constant;

the plurality of switching transistors, each of which is connected in parallel to the load, for providing the load-side output direct-current voltage to the load according to the load control signal; and a portion which supplies the load control signal to, so as to activate, all of said plurality of switching transistors, when said load-light/heavy detection signal indicates that the power consumed in the load to which the load-side output direct-current voltage is provided is large, and supplies the load control signal to, so as to activate, only one of said plurality of switching transistors, when said load-light/heavy detection signal indicates that the power consumed in the load to which the load-side output direct-current voltage is provided is small.

18. A DC-DC converter which is a kind of a switching-type constant-voltage power supply in which switching control is performed on switching transistors so that an external supply voltage from an external supply power source is converted into a predetermined constant voltage, wherein a duty factor which is the ratio of the ON period to the total of the ON period and the OFF period of said switching transistors is changed so that the ON period is elongated when a load-side output direct-current voltage has decreased and the ON period is shortened when the load-side output direct-current voltage has increased, said DC-DC converter comprising:

a load-current detecting portion which detects whether power consumed in a load to which the load-side output direct-current voltage is provided is large or small, and generates a load-light/heavy detection signal corresponding to whether said power is large or small;

a PWM-control-frequency generating oscillator which generates a clock signal for generating a PWM control signal specifying control parameters for performing pulse-width modulation control in which control a PWM control frequency for turning on and turning off said switching transistors is low when said oscillator determines, based on the load-light/heavy detection signal, that a load-side output direct current is small, and generates the clock signal for generating the PWM control signal specifying the control parameters for performing the pulse-width modulation control in which control the PWM control frequency for turning on and turning off said switching transistors is high when said oscillator determines, based on the load-light/heavy detection signal, that the load-side output direct current is large;

an error detection amplification portion which detects the amount of deviation of the value of the load-side output direct-current voltage from a target voltage value, and generates an error detection amplification signal corresponding to the amount of deviation;

a controller which generates, based on the clock signal, a load control signal for pulse-width modulation control for changing the duty factor of said switching transistors so that the ON period of said switching transistors is elongated when said controller determines based on the error detection amplification signal that the load-side output direct current has increased, and the ON period of said switching transistors is shortened when said controller determines based on the error detection amplification signal that the load-side output direct current has decreased, in the condition in which the PWM control frequency is kept constant;

the plurality of switching transistors, each of which is connected in parallel to the load, for providing the load-side output direct-current voltage to the load according to the load control signal; and a portion which changes, according to the load-light/heavy detection signal, the number of switching transistors to be activated, from among said plurality of switching transistors, which number is at least one, the load control signal being supplied to said switching transistors to be activated.

* * * * *